INVENTOR.
PAUL BÖTTCHER.

Oct. 13, 1953     P. BÖTTCHER     2,655,055
DIFFERENTIAL GEAR FOR MOTOR-DRIVEN VEHICLES
Filed April 5, 1952     2 Sheets-Sheet 2

INVENTOR.
PAUL BÖTTCHER.
BY
ATTORNEY.

Patented Oct. 13, 1953

2,655,055

UNITED STATES PATENT OFFICE 2,655,055

DIFFERENTIAL GEAR FOR MOTOR-DRIVEN VEHICLES

Paul Böttcher, Hamburg-Grossflottbek, Germany

Application April 5, 1952, Serial No. 280,817

4 Claims. (Cl. 74—711)

The present invention relates to an improved differential gear for driving the rear axles of a motor-driven vehicle, which gear includes an oil-operated damping device that does not cause additional loads impeding steering and increasing wearing of tires when driving at normal conditions around curves but automatically develops considerable hydraulic braking torque and still greater mechanical braking torque when one rear wheel loses contact with the ground.

The present application is a continuation-in-part of my copending application Serial No. 267,775, filed January 23, 1952.

The gears in a differential gear rotate only when the vehicle proceeds on a curved course. The speed of this rotation is very slow and does not exceed 10 to 15 revolutions per minute for all practical purposes since only the difference between the speeds of the rear wheels must be equalized. The differential speed of 15 revolutions per minute may therefore be called a critical speed. All slow movements up to this critical speed must be possible without appreciable braking effect and without impairing steering and positive drive of both rear wheels when moving on curves.

The speed of the differential gears is greater than the aforementioned critical speed only when the wheels are not uniformly braked as is the case when one wheel spins on slippery or icy ground.

It is an object of the present invention to provide a differential gear for motor-driven vehicles in which the speed of the gears is limited to 10 to 15 revolutions per minute or the the maximum speed required for moving around corners and on curves, eliminating all faster and dangerous movements.

In most conventional hydraulically damped differential gears, a stationary filler member is inserted between the differential gears, the exterior of the filler member enveloping the uncovered surfaces of the pinions and side gears as does the casing in a gear pump. Although constituting a considerable improvement, present designs of hydraulically damped differential gears are not generally used because they are not fully satisfactory in practical operation. Excessive oil pressure is needed in such differentials, if they are of standard size, for producing sufficient hydraulic braking effect to prevent spinning. Very small clearances are essential to produce the required high oil pressure, necessitating very careful machining of all parts which makes such differential gears too delicate and their cost too great for practical purposes. The fluid passages between the pressure and suction zones of hitherto proposed constructions are so small that the slow movement of the gears on a curved course produces pressures which are too high and impede steering, particularly when the braking fluid is cold and has a low viscosity.

The differential gear according to the invention incorporates an entirely new principle. The conventional filler member is replaced by an expansible and elastic combined filler and mechanical braking member. It has sealing faces which are pressed against the top faces of the gear teeth by the fluid pressure developed between the differential gears. With the new filler device, the flow areas of the oil passages between pressure zones and suction zones can be made so great that no appreciable hydraulic pressure is produced while running around curves, even if the oil is cold and thick. The rising oil pressure overcomes an elastic resistance and effects closing of the oil passages after the aforedescribed critical speed is exceeded, for example, when one of the rear wheels loses contact with the ground. The rapid rise of the oil pressure produced at this moment due to the interruption of the oil circulation causes a great hydraulic and mechanical braking moment by compressing all braking parts of the device according to the invention.

In this way, a maximum braking torque is effected soon after the critical speed has been reached, independently of the size of the normal clearances and of varying oil viscosities.

With the new device, great mechanical friction is obtained with relatively low fluid pressure because the friction is produced as in a multiple disc clutch between a great number of frictionally engaged surfaces, the new filler-braking members pressing against the top faces of the gear teeth of all pinions and side gear wheels of the differential gear and all gear naves pressing against the walls of the differential case. The oil pressure in the device according to the invention amounts only to one quarter of the oil pressure required in hydraulically braked differentials having rigid filler members, for obtaining the same braking effect. Since the mechanical friction occurs very infrequently and only for very short periods, there is no objectionable wear.

Further and other objects of the present invention will be hereinafter set forth in the accompanying specification and claims and are shown in the drawings which, by way of illustration, show what I now consider to be a preferred embodiment of the invention.

In the drawings:

Fig. 1 is a longitudinal sectional view of a conventional differential gear equipped according to the invention, the inside of the differential case being shown in the upper half of the figure in a position turned 90 degrees relative to the showing in the lower half of the figure, i. e. the upper part of the figure showing the inside of the differential case being cut in a plane containing the rotation axes of the pinions and side gears and the lower part in a plane at a right angle to the axis of the differential pinions;

Like parts are designated by like numerals in all figures of the drawings.

Figure 1:
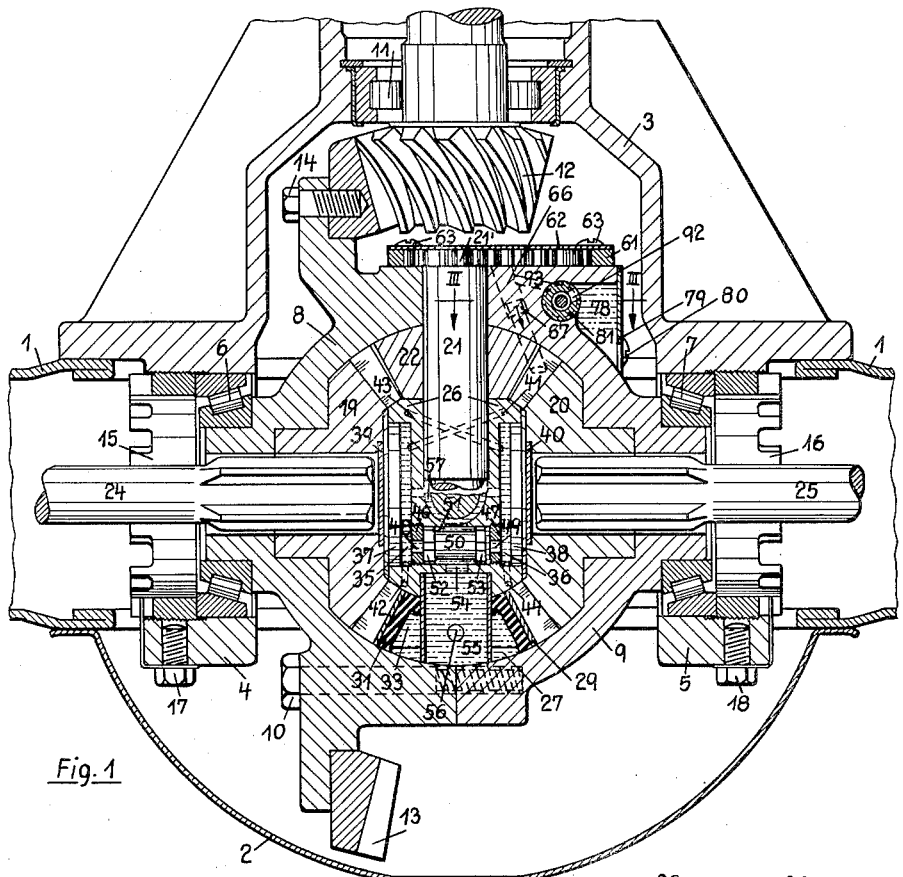
Figure 2:
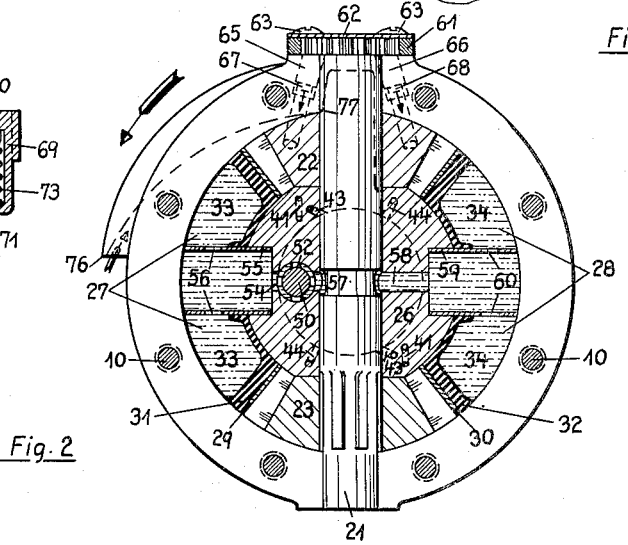
Fig. 2 is a view into one half of the differential case, the view being taken in the direction of the rotation axis of a rear axle; the figure shows a section through the central part and through the arched expanding parts of the new filler member, the section being taken in a plane containing the axis of the differential pinions and at a right angle to the rotation axis of the rear axles.

Referring more particularly to Figs. 1 and 2 of the drawing, numeral 1 designates a rear axle housing which is closed by a cover 2 in the conventional manner. Numeral 3 designates a differential carrier comprising bearings 4, 6 and 5, 7 which support a differential case consisting of two parts 8 and 9 which are connected by bolts 10. Numeral 11 designates a bearing for a pinion 12 mating with gear wheel 13 which is bolted to the differential case part 8 by bolts 14. Threaded bushes 15, 16 secured by screws 17 and 18 fix the differential case in axial direction in the carrier 3.

The differential case supports side gears 19 and 20 and, at a right angle to the rotation axis of the latter, a shaft 21 for pinions 22 and 23. Rear axles 24 and 25 are keyed to side gears 19 and 20, respectively. The pinions 22 and 23 rotate only if the speeds of axles 24 and 25 are different, for example when the vehicle runs on a curve. Pinion 22 rotates freely on shaft 21 which is keyed to pinion 23, see Fig. 2, in order to rotate together with it. One end of shaft 21 is provided with the teeth of a small spur gear wheel 21'.

The outer surfaces of the pinions and side gears are spherical and conform with the spherical inside wall of the differential case to which they are so closely adjacent as to form a seal for the oil between the meshing teeth of the pinions and side wheels.

The space within the differential casing which is not occupied by the pinions 22, 23 and the bevel wheels 19, 20 is filled by a filler member which prevents flow of oil from the gaps between the teeth of the gear wheels. The filler member comprises a central portion 26 sealing the lateral ends of the gaps facing the center of the differential gear and two individual arcuate parts 27 and 28 which fill the spaces between the toothed surfaces of the pinions and side gear wheels. The arcuate parts 27, 28 of the filler member may be constructed in several ways to produce the new result which is an object of the present invention. In the illustrated embodiment of the invention, the arcuate parts 27, 28 comprise flexible frames 29 and 30, respectively, which are made of sheet steel and so bent as to follow the toothed surfaces of the pinions and of the bevel wheels. A pocket member 31 and 32, respectively, made of elastic material, for example, rubber, is inserted in the steel frames 29 and 30, respectively, and chemically secured thereto, if desired. The pockets or cavities of the pocket members 31 and 32 are filled with oil and form pressure chambers 33 and 34, respectively, together with the inside wall of the differential gear case. The elastic pocket members 31, 32 seal the pressure chambers 33, 34 against the gaps between the teeth of the gear wheels as well as against the central part 26 of the filler member and against the interior wall of the differential gear case 8, 9.

The pressure chambers 33, 34 communicate with the oil pressure zones adjacent to and produced by the differential bevel gears as in a gear pump wherever the teeth move into engagement. The expansive arcuate parts 27, 28 expand in all directions when the pressure in chambers 33, 34 rises, causing the outside surfaces of the steel frames 29, 30 to be pressed against the faces of the teeth of all differential bevel gear wheels.

Communication between the pressure zones of the differential gears and the pressure chambers 33, 34 inside of the expansive arcuate parts of the filler member is effected through the central part 26. The sides of the latter which are opposite the end surfaces of the bevel gear wheels are provided with short coaxial cylindrical recesses 35, 36 which are also coaxial with the shafts 24 and 25. The recesses are covered by discs 37, 38, respectively. The bores of the bevel wheels 19 and 20 are sealed by discs 39 and 40, respectively, which are opposite discs or covers 37 and 38.

Upon relative rotation of the pinions 22, 23 and the bevel wheels 19, 20, four oil pressure zones are produced where the teeth become engaged, and four suction zones are produced where the teeth become disengaged. If the direction of rotation is reversed, the suction zones become pressure zones and the pressure zones become suction zones.

The four zones of substantially equal pressure are connected by bores 41, 42 with the recess 35, and the other four zones of equal pressure, which is different from that in the first four zones, are connected by conduits 43, 44 with the recess 36. In this way the pressure in each of the four zones of substantially equal pressure is equalized and the oil in one recess is subjected to pressure and that in the other recess to suction upon rotation of the differential wheels.

As shown in Fig. 1, the recesses 35 and 36 are interconnected by a bore into whose ends are inserted bushes 46, 47 having axial apertures 48, 49, respectively. A double-acting piston valve member 50 is axially slidable in the bore between bushes 46 and 47. Member 50 has axial grooves 52, 53 at its ends connecting the latter for oil flow with an annular recess 51 in the center of the member. If oil enters the bore, for example, through aperture 49, valve member 50 is pushed towards aperture 48 and oil can flow freely from aperture 49 into recess 51, whereas the left end face of member 50 closes aperture 48. If the pressure in the recesses 35, 36 is reversed, member 50 is moved to the right. As soon as pressure and suction zones are produced due to rotation of the differential gears, one side of member 50 is subjected to pressure and the other side to suction. This assures axial movement of the valve member without springs or the like. The pressure in recess 51 is always equal to that in the pressure zones independent of the direction of rotation of the differential gear wheels.

Recess 51 is connected with a tube 55 by means of bore 54, the tube extending into the yielding pocket 31 and transmitting the oil pressure in recess 51 through apertures 56 into the pressure chamber 33.

As illustrated in Fig. 2, shaft 21 of the differential pinions has an annular recess 57 in the center of the differential gear, the recess communicating with recess 51 (see Fig. 1). Recess 57 is connected with a tube 59 through bore 58, tube 59 extending into pressure chamber 34 in pocket member 32 and connecting chamber 34 with the interior of tube 59 by means of bores 60.

Therefore any oil pressure produced by rotation of the differential gears in any direction is simultaneously transferred into both pressure chambers 33 and 34.

Due to the clearance between the expanding arcuate portions of the filler members and the differential bevel gears, oil circulates through the passages between the exterior surfaces of the steel coatings and the adjacent tooth heads from the pressure zones to the suction zones in opposite direction to the movement of the teeth. If the differential is set in motion, a pressure drop occurs between the pressure zones and the suction zones, causing the oil to cascade from one tooth gap into the next following tooth gap. Simultaneously, the pressure of the stationary oil within the steel coats corresponds to the maximum pressure in the pressure zones because the cavities within the coats are connected by the aforedescribed double valve member 50 with the pressure zones. The tooth gaps coming from the suction zones and containing no oil under pressure continue to move under the sealing faces of the steel coats and suck the coat whose inner surface is exposed to high pressure onto the adjacent tooth heads. This action is absolutely reliable and independent of accuracy of fitting, so that all clearances are closed and the steel coat of the filler member is firmly pressed against the gear wheels.

Figure 7:
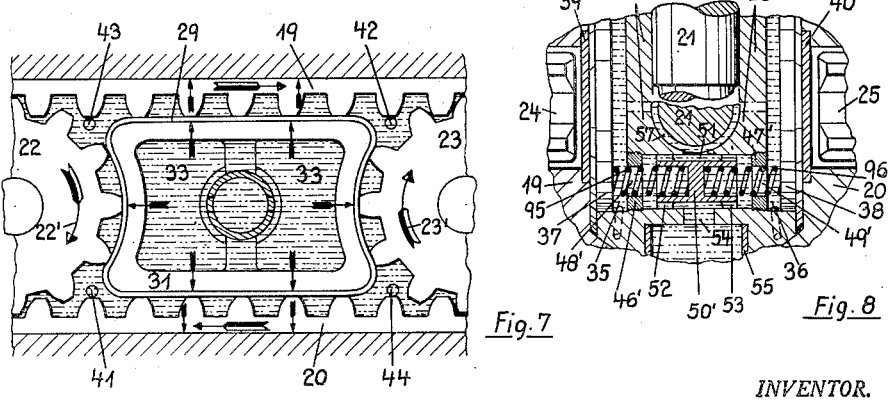
Fig. 7 is a diagrammatic illustration of the interior of a differential gear showing an expansible part of the filler member according to the invention in expanded condition.

Fig. 7 illustrates diagrammatically, in a plane, the position of the arcuate expanding portion of a filler member between the pinions and side bevel gears. The steel coat 28 is pressed outward in all its parts by the oil pressure inside the rubber bag 31 against the tooth heads of the pinions 22 and 23 and the side bevel gear wheels 19 and 20. This causes effective mechanical friction between the tooth head surfaces of all tooth wheels and the outside of the steel coat and also between the hubs of the bevel gear wheels and the adjacent wall portions of the differential case. Rotation of the gear wheels in the direction of the arrows, those for the bevel gear wheels 22 and 23 being numbered 22' and 23', causes formation of pressure zones at 41 and 42 and suction zones at 43 and 44. The pressure in the pressure zones is fully transferred by the valve 50 into the interior of the steel coats.

The stiffness of the latter offers a predetermined resistance against deformation, which must be overcome before the steel coats expand. The oil pressure necessary for overcoming this resistance is so high that no (accidental) lower pressure can effect the change-over to high pressure operation by closing the clearances.

Figure 8:
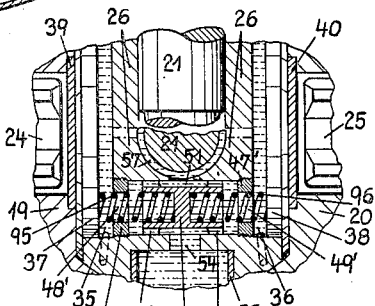
Fig. 8 is a large scale view of a modified portion of Fig. 1.

The passage for the circulation of the oil between the pressure and suction zones is preferably arranged in the central portion of the filler means according to the invention. In the modification shown in Fig. 8, valve 50 is modified to permit circulation as long as the difference between the oil pressure in the pressure zones and that in the suction zones is below a certain predetermined value. The cavities 35 and 36 are permanently connected with the pressure and suction zones, respectively. Valve 50' in the passage connecting the cavities or chambers 35 and 36 is held in its middle position in which both its ends are open by means of springs 95 and 96, as long as the car of which the differential is a part runs normally on a straight course and around curves. The springs 95 and 96 are inserted in recesses at opposite ends of valve member 50' and extend through bores 48' and 49', respectively, of the bushings 46' and 47', respectively, into the chambers 35 and 36, respectively, abutting against the interior walls thereof. At normal rotation of the differential bevel gear wheels when the car runs in a curve, oil flows, for example, from chamber 35 through the open valve 50' into chamber 36 and therefrom into the suction zones or vice versa.

Pressure is built up in the pressure zones because of the flow resistance of the oil passages 48 and 49 and the double valve 50'. The annular recess 51 is in the middle of the oil circuit between pressure and suction zones and the pressure thereat, if valve 50' is open, is about in the middle between the pressure in the pressure zones and that in the suction zones. Recess 51 communicates permanently with the interiors of the filler members and the pressure in these interiors is therefore also about one-half of the pressure in the pressure zones.

If one wheel of the vehicle equipped with the differential loses contact with the ground, oil circulation in the differential increases, causing an increase of pressure which is sufficient to overcome the tension of one of the springs 95 or 96 and to move valve 50' to one side until it closes opening 48' or 49'. At this moment the oil pressure increases rapidly without increase of the rotational speed of the bevel gear wheels. Since the oil flow through valve 50' is interrupted, the oil pressure in recess 51 and in the interiors of the filler members rapidly reaches the same value as in the pressure zones because the oil in these interiors is stationary.

Springs 95 and 96 are compressed and expanded only on the rare occasions when one wheel loses contact with the ground. The device operates reliably at all times. Even if for some reason the springs fail to return the valve 50' to its middle position, the valve will assume its normal middle position when the car runs on a curve which is opposite the previous curve because of the reversal of the oil pressure.

Due to centrifugal action, empty spaces in the gaps between the teeth of the differential gears never occur adjacent to the interior wall of the differential gear case but always occur first at the small diameter of the bevel gears. The empty spaces in the tooth gaps can therefore never be refilled by drawing oil through a suction valve in the exterior wall of the differential case as has been proposed.

Figure 6:
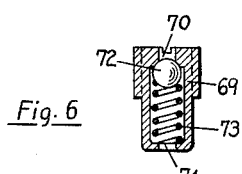
Fig. 6 is a longitudinal section through an inlet valve for filling the differential case by the gear pump shown in Fig. 5.
Figure 5:
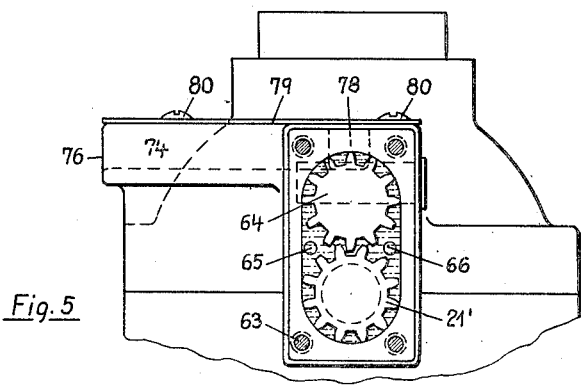
Fig. 5 is a partial end view of the device shown in Fig. 2 and illustrates a gear pump for fluid supply placed outside of the differential case, the cover plate of the gear pump being removed.

A small special oil pump is built into the outside of the differential case for replacing unavoidable oil losses by pumping oil from the oil sump of the axle housing. Any conventional pump may be used for this purpose, a spur gear pump being shown in the illustrated embodiment. It comprises a pump casing 61 having a cover 62 and being connected by screws 63 with the outside wall of the differential case. Casing 61 contains two spur gear wheels 21' and 64. The teeth of the driving wheel 21' are cut into a collar on the outer end of shaft 21. Since the latter is keyed to pinion 23, pump wheel 21 rotates therewith. The driven pump wheel 64 rotates freely in the pump casing 61. Bores 65, 66 in the differential case (Figs. 2 and 5) connect the pressure and suction zones of the gear pump with the suction and pressure zones, respectively, in the differential gear. Oil is thus forced from the pressure zone in the gear pump into a suction zone of the differential gear. In order to prevent flow of oil from the differential gear back into the gear pump, both bores 65 and 66 are provided with check valves 67, 68 which open at the slightest excess pressure in the pump casing. As seen in Fig. 6, the check valves comprise a housing 69 containing a helical spring 73 and provided with apertures 70 and 71 at its ends, a ball 72 closing aperture 70 if the pressure of spring 73 exceeds that of the oil in the gear pump.

Figure 4:
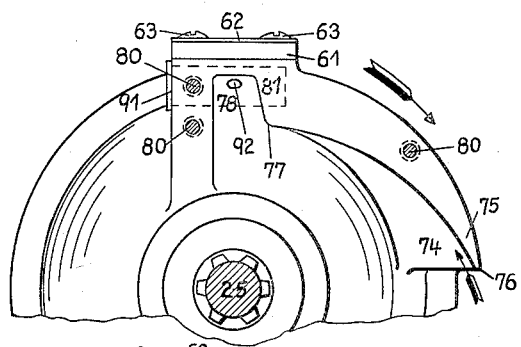
Fig. 4 is a partial outside view of the device shown in Fig. 2.

To fill the gear pump casing 61 with oil from the sump in the rear axle housing, a scoop 74 is provided on the outside of part 9 of the differential casing. The scoop has a tongue 75 projecting from the outside wall of the casing and terminating in a sharp scooping edge 76 which periodically dives into the oil sump when the gear case is rotated. The scooped oil reaches a corner 77 of the oil inlet conduit due to its inertia and against centrifugal forces and fills a small reservoir 78 in which the oil is held by centrifugal force as long as the gear case is rotated so that it cannot return to the sump, since the distance of reservoir 78 from the rotation axis is greater than that of the corner 77. The reservoir is always filled with oil. The reservoir 78 and the scooping conduit 74 are closed at the side by a cover plate 79 which is secured in place by screws 80 and which is removed in Fig. 4. A double-acting inlet or filling valve 81 controls the flow of oil from the reservoir 78 into the suction zones in the pump casing 61.

Figure 3:
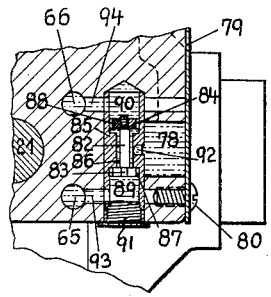
Fig. 3 is a sectional view of a part of the device shown in Figs. 1 and 2, the section being taken along line III—III in Fig. 1.

Fig. 3 is a section through the valve 81 whose valve stem 82 has a collar 83 at one end and collar 84 screwed to the opposite end. Stem 82 is axially slidable in a sleeve 85. The diameter of the central portion of the stem is smaller than that of the bore in sleeve 85, leaving an annular space 86. Collars 83 and 84 have longitudinal grooves 87, 88, respectively, providing passages for the oil from the space 86 into cavities 89, 90, respectively, at the ends of the sleeve 85. One end of sleeve 85 is closed by a screw 91. The interior of the sleeve communicates with reservoir 78 through an aperture 92 in the middle of the sleeve so that space 86 is always filled with oil from reservoir 78. The insides of the end portions of the sleeve 85 are connected with bores 65, 66 outside of the inlet valves 67, 68 (Fig. 2) by bores 93, 94, respectively, and consequently with the pressure or suction zones of the pump casing 61. Depending on the direction of rotation of the gear pump, the oil of the pressure zone moves valve stem 82 axially until the collar on the pressure side of the valve seals the respective end portion of the sleeve 85 against the space 86, whereas at the opposite end of the valve a connection is provided for oil flow from space 86 into the suction zone of the gear pump. Valve 81 is thus absolutely reliably actuated by the oil pressure and without springs, controlling the flow of oil from reservoir 78 into the suction zone of the gear pump. Since the pump casing 61 is farther away from the rotation axis of the differential casing than the valve 81, the pump casing is filled independently of unreliable suction effects, due to centrifugal forces. Oil supply from the oil sump into the rotating differential casing is effected reliably throughout the supply system, the oil being simply scooped into the reservoir 78 and conducted therefrom by centrifugal force through valve 81 into pump casing 61 wherefrom it is positively pumped against centrifugal forces either through inlet valve 67 or 68 into the interior of the differential casing.

If the gear pump produces oil pressure and there is no empty tooth gap in the differential gear, oil escapes from the pressure zone in the pump casing 61 by leakage between the wall of the casing and the cover plate 62. The latter is thin and flexible and so connected with the pump casing that a little excess pressure in the pump causes leakage, and pumped oil is discharged and returned to the axle housing without special relief valves. The pressure in the pump casing need never be greater than that permitted by the aforedescribed relief system; a greater pressure would only reach the suction zones of the differential gearing through inlet valve 67 or 68 and would impair operation inside the differential gear case.

The drawing illustrates application of the invention to a differential gear having two pinions. It is obvious that the invention can be easily adapted to differential gears having more than two pinions.

While I believe the above described embodiment of my invention to be preferred embodiment, I wish it to be understood that I do not desire to be limited to the exact details of method, design, and construction shown and described, for obvious modifications will occur to a person skilled in the art.

I claim:

1. In a differential gearing of the bevel gear type, the combination of a differential case rotatably mounted in an axle housing, means for driving said differential case, a set of differential pinions and differential side gear wheels rotatably mounted in said differential case and being permanently in mesh with one another, two independent axle shafts individually connected with and driven by said differential side gears, a filler and braking member filling the space in said case not occupied by said pinions and said side gear wheels, said filler and braking member comprising a rigid central part having surface portions adjacent to the inside faces of said pinions and side gear wheels, said filler and braking member also comprising arcuate parts, each of said arcuate parts being formed by a pocket member having a cavity and expansible surface portions, the latter being adjacent to the top faces of the teeth of said pinions and side gear wheels, means for filling said differential case with a brake fluid, and passage means interconnecting said cavities and the interior of the differential case adjacent to the points of engagement of the teeth of said pinions with the teeth of said side gear wheels and transmitting the fluid pressure in the pressure zones in the differential gearing produced by the engagement of the teeth of said pinions and side gear wheels to said cavities, said arcuate parts of said filler and brake member expanding and said surface portion pressing against the top faces of the teeth of the pinions and side gear wheels upon increase of fluid pressure in said cavities.

2. In a differential gearing as defined in claim 1, said pocket members being made of elastic material and said surface portions being made of sheet metal.

3. In a differential gearing as defined in claim 1, said pocket members being made of rubber and said surface portions being covered by sheet metal chemically connected with the rubber.

4. In a differential gearing as defined in claim 1, said passage means including a double-acting valve, spring means holding said valve normally in open position, said spring means being counteracted by a predetermined difference of fluid pressure in the differential gearing adjacent to the points of engagement and the points of disengagement of the teeth of said pinions and the teeth of said side gear wheels for connecting the pressure zones at the points of engagement with said cavities and closing the suction zones at the points of disengagement from said cavities.

PAUL BÖTTCHER.

References Cited in the file of this patent

UNITED STATES PATENTS

| Number | Name | Date |
|---|---|---|
| 1,251,466 | Bilgram | Jan. 1, 1918 |
| 1,266,712 | Reagan | May 21, 1918 |
| 1,277,837 | Bilgram | Sept. 3, 1918 |
| 1,324,855 | Taylor | Dec. 16, 1919 |
| 1,916,715 | Corey | July 4, 1933 |
| 2,375,938 | Moon | May 15, 1945 |

FOREIGN PATENTS

| Number | Country | Date |
|---|---|---|
| 499,048 | Great Britain | Jan. 18, 1939 |